United States Patent [19]

Khoe et al.

[11] Patent Number: 5,237,442

[45] Date of Patent: * Aug. 17, 1993

[54] DEVICE FOR OPTICAL HETERODYNE DETECTION AND MIRROR SYSTEM SUITABLE FOR USE IN SUCH A DEVICE

[75] Inventors: Giok D. Khoe; Kieran G. Wright, both of Eindhoven, Netherlands

[73] Assignee: U.S. Philips Corp., New York, N.Y.

[*] Notice: The portion of the term of this patent subsequent to Mar. 26, 2009 has been disclaimed.

[21] Appl. No.: 882,747

[22] Filed: May 11, 1992

Related U.S. Application Data

[63] Continuation of Ser. No. 593,832, Oct. 5, 1990, abandoned, which is a continuation-in-part of Ser. No. 395,071, Jun. 12, 1990, Pat. No. 5,003,625.

[30] Foreign Application Priority Data

Jun. 13, 1990 [NL] Netherlands ............... 9001332

[51] Int. Cl.⁵ .................. G02B 5/30; G02B 27/28; H04B 10/06
[52] U.S. Cl. .................. 359/189; 359/192; 359/487; 359/638
[58] Field of Search .......... 350/402, 172, 173; 353/20, 33, 81; 359/189, 190, 191, 192, 487, 629, 638

[56] References Cited

U.S. PATENT DOCUMENTS

| | | | |
|---|---|---|---|
| 1,994,531 | 3/1935 | Peck | 350/173 |
| 2,106,752 | 2/1938 | Land | 350/173 |
| 2,234,665 | 3/1941 | Bauer | 350/173 |
| 2,642,487 | 6/1953 | Schroeder | 350/173 |
| 2,737,076 | 3/1956 | Rock, Jr. | 350/173 |
| 4,726,684 | 2/1988 | Tokumaru | 350/173 |
| 4,933,751 | 6/1990 | Shinonaga et al. | 350/173 |
| 4,969,730 | 11/1990 | van den Brandt | 350/173 |
| 5,003,625 | 3/1991 | Khoe | 350/172 |

OTHER PUBLICATIONS

"Optical Heterodyne Detection" by O. E. DeLange; IEEE Spectrum, Oct. 1968 pp. 77–85.

*Primary Examiner*—Martin Lerner
*Attorney, Agent, or Firm*—William L. Botjer

[57] ABSTRACT

In an optical heterodyne or homodyne receiver an optical system (140) is used in which the local oscillator beam (L) is combined with the signal beam (S). Simultaneously, these beams are split into orthogonally polarized sub-beams. For this purpose the optical system (140) comprises polarization-sensitive beam-splitting layers (141a and 141b) and neutral beam-splitting layers (142a and 142b) which function as beam-combining elements. In order to align the directions of the exit sub-beams of the signal beam ($I_1$, $S_{12}$, $S_2$, $S_{22}$) and the local oscillator beam ($L_{11}$, $L_{12}$, $L_{21}$, $L_{22}$), the angles ($\alpha$, $\beta$, $\gamma$, $\delta$) enclosed by the beam-splitting faces are chosen to be such that two angles located opposite each other have a combined magnitude of 180°. This is realised by providing the layers (141a, 142b and 141b, 142a) on side faces of one prism (140a, 140b).

15 Claims, 4 Drawing Sheets

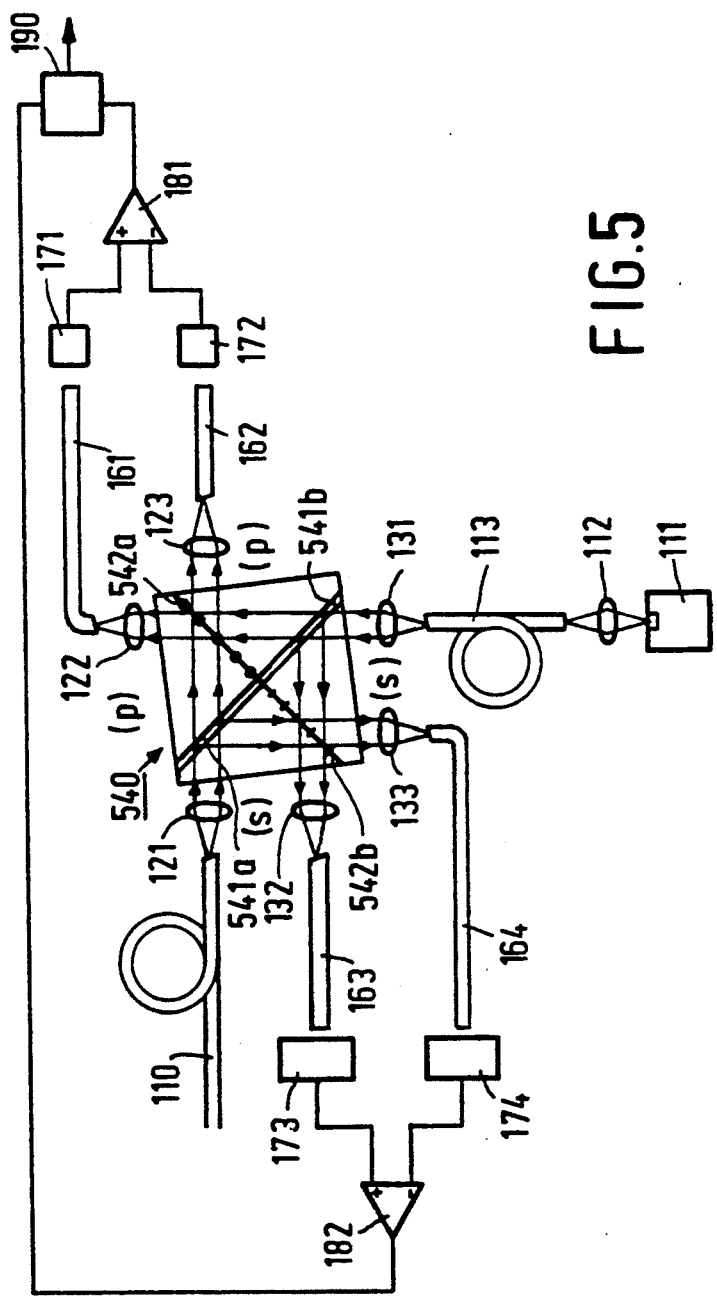

DEVICE FOR OPTICAL HETERODYNE DETECTION AND MIRROR SYSTEM SUITABLE FOR USE IN SUCH A DEVICE

This is a continuation of application Ser. No. 07/593,832, filed Oct. 5, 1990, now abandoned which in turn is a continuation-in-part of application Ser. No. 395,071 filed Jun. 12, 1990 now U.S. Pat. No. 5,003,625.

BACKGROUND OF THE INVENTION

1. Field of the Invention

The invention relates to a device for optical heterodyne or homodyne detection of an optical signal beam, which device comprises a local oscillator, an optical system comprising a polarization-sensitive beam-splitting layer for splitting the signal beam into two orthogonally polarized sub-beams and a beam-combining layer for combining signal beam radiation with local oscillator radiation, said device further comprising a detection system for converting the combined radiation into at least one electric signal which is suitable for further processing.

2. Description of the Related Art

Devices for optical heterodyne detection are sued in optical signal transmission. By mixing the signal beam in a heterodyne detection device with an optical beam from a local oscillator, a considerably better result with regard to the signal-to-noise ratio and the discrimination of background radiation is obtained as compared with direct detection of the signal beam. The invention also relates to a mirror system for splitting a first and a second incident radiation beam into four exit sub-beams each, each sub-beam from the second incident radiation beam exiting in the same direction as one of the sub-beams from the first incident radiation beam, said mirror system comprising four partially transparent mirror portions which enclose four angles. Such a system is suitable for use in a device according to the invention.

The principle of heterodyne detection of optical radiation has been extensively described in the article "Optical Heterodyne Detection" by O. E. DeLange in the journal "IEEE Spectrum" of October 1968, p. 77–85. As has been stated in this article, it is important that the states of polarization of the signal beam and the local oscillator beam correspond as much as possible. A possible solution to achieve this is to split the signal beam into two sub-beams having a fixed and mutually orthogonal state of polarization. The two sub-beams are then combined with local oscillator radiation which is polarized in the same state.

In principle, four components are required for splitting and combining the beams: two polarization-sensitive beam splitters for splitting the signal beam and the local oscillator beam, respectively, and two beam-combining elements for combining the sub-beams formed. By firstly combining the signal beam with the oscillator beam and only thereafter splitting it by means of a polarization-sensitive beam splitter into two orthogonally polarized sub-beams, one of the beam-combining elements can be dispensed with. Since a beam-combining element not only has two inputs but necessarily also two outputs, two polarization-sensitive beam splitters remain required to receive and detect all signal radiation.

A device as described in the opening paragraph is known from EP-A 0,345,889 which corresponds to U.S. Pat. No. 5,003,625, see particularly FIG. 3 of said document. In this device the beam-splitting and beam-combining elements are integrated in an optical component comprising two beam-splitting layers. One of the layers is a polarization-sensitive beam-splitting layer, while the other beam-splitting layer is neutral with respect to the state of polarization of the incident light and is used as a combining element.

The two layers must be disposed with regard to each other and with respect to the entrance beams in such a way that the four exit sub-beams of the signal beam and the four exit sub-beams of the local oscillator beam exit pairwise in the same direction. This imposes strict requirements on the angles at which the beam-splitting faces should extend to each other. This is particularly the case when the beam-splitting layers intersect each other and the radiation beams are incident on four different locations on the layers as is shown in the embodiment in FIG. 3 of EP-A 0,345,889.

SUMMARY OF THE INVENTION

The invention has, inter alia, for its object to provide a device as described in the opening paragraph in which the tolerances which have to be taken into account when manufacturing the mirror system or the components are more flexible. To this end the device according to the invention is characterized in that the beam-splitting layer and the beam-combining layer consists of two portions each, said four portions enclosing four angles, the value of at least one of the angles being different from 90° and the sum of two located opposite each other angles being 180°. As will hereinafter be described in greater detail with reference to FIG. 2, it has been found that the requirements regarding the angles between the beam-splitting layers only relate to the sum of two located opposite each other angles and do not relate to the value of each individual angle.

An embodiment of the device according to the invention is characterized in that one of the angles and the angle located opposite to it each have a value of 90°. Since equal angles between the four portions of the beam-splitting layers are preferred, at least one angle and hence opposite to the angle it should be 90°. According to the invention, however, the accuracy with which the two intermediate angles are defined when manufacturing the optical component can be considerably more flexible so that the two intermediate angles may have a value which is different from 90°.

An optical component or mirror system as used in the device according to the invention is manufacture, for example, by securing a plurality of prisms to each other whose apex angles face each other. The beam-splitting layers are then provided on eh side faces of the prisms. The principle described in the foregoing is realised in that a device as described in the opening paragraph is characterized in that the optical system comprises at least one prism having two side faces which enclose an apex angle and in that said two side faces of the prism are provided with a portion of the beam-splitting and beam-combining layers, respectively. Since the portions of the beam-splitting layers are provided on the side faces of one and the same prism, for example, through sputtering or vapour deposition, the angle enclosed by the portions is equal to the apex angel of the prism and is no longer dependent on the accuracy with which the prism is fit into the optical component.

A first embodiment of the device according to the invention, in which the desired stability and accuracy is obtained for the two opposite angles, is characterized in that the optical system comprises two prisms arranged opposite each other whose apex angles are located opposite each other and in that the side faces of the two prisms enclosing the apex angles are provided with portions of the beam-splitting and beam-combining layers, respectively.

This embodiment is further characterized in that the apex angle of a said prism has a value of 90°. Although the invention is not limited to a mirror system or component in which the angle between the portions of the beam-splitting layers is 90°, this embodiment has its advantages in practice for the construction of the entire device. In this construction the light guides can be connected approximately perpendicularly to the side faces of the component, while the assembly has a substantially symmetrical structure.

An embodiment of the device according to the invention is characterized in that each portion of the beam-combining layer has a polarization-dependent transmission and/or reflection coefficient and in that each portion is arranged in the radiation path of one of the sub-beams for passing and reflecting the radiation in the respective sub-beam to the desired extent. Due to this measure a layer which is really insensitive to polarization can be dispensed with as a beam-combining layer.

In the device which is known from EP-A 0,345,889 the beam-combining layer is constituted by a beam-splitting layer which is neutral with respect to the state of polarization of the incident light. A really polarization-insensitive layer is, however, relatively difficult to make and is thus expensive. Such a really neutral layer is required in the known device because polarization effects occurring on this layer functioning as a beam-combining element have a distinct effect on the operation of the coherent detection device.

However, according to the invention use is made of the fact that the radiation incident on the beam-combining layer does not have an arbitrary polarization, but that this radiation is polarized in a fixed state. Hence, the beam-combining layer need not be really neutral with respect to the state of polarization, but a layer may suffice which has the desired, for example, equal transmission and reflection coefficient for radiation of the state of polarization incident on the layer. Such layers are considerably cheaper and easier to manufacture than really polarization-insensitive layers.

This embodiment of the device according to the invention is further characterized in that each of the two portions of the beam-combining layer is individually optimized for passing and reflecting radiation to the desired extent, which radiation is linearly polarized in the p and s directions, respectively, with respect to the polarization-sensitive beam-splitting layer. In practice, a coherent diversity detector is often implemented with linear polarization filters and with beams extending at an angle of 45° to the beam-splitting faces. The term p-polarization is understood to mean radiation whose electric vector is directed parallel to the face which is subtended by the direction of the radiation beam and the normal of the polarization-sensitive beam-splitting face. The s-polarization is the other, orthogonal state of polarization.

A further embodiment of a device according to the invention is characterized in that the optical system has at least one reflecting face which is arranged in a radiation path of an entrance or exit radiation beam for deflecting said radiation beam. The optical fibers or waveguides with which the entrance and exit radiation beams are supplied or removed can then be arranged in positions which are to be preferred for a compact or simple structure of the device.

Reflections occur at the entrance and exit faces in the coherent detection device, inter alia, at the faces of the light guides and the other optical components. For example, due to repeated reflections and interference phenomena therebetween, such reflections may disturb the reception of the signal, which disturbance should be avoided as much as possible. Reflections can be reduced, for example, by providing an anti-reflection coating. To reduce the disturbing influence of the remaining reflections on the faces of the integrated optical component to a further extent, the device according to the invention is characterized in that it has at least one entrance or exit face whose normal extends at an angle to the radiation path of a radiation beam through said entrance or exit face, said angle having a value of between approximately several tenths of a degree and several degrees. Since the entrance and/or exit faces are slightly oblique, of the order of 1°, with respect to the radiation beam passing through them, the radiation reflected on the face is not received in the light guides. The reception of the signal is not disturbed. To avoid radiation losses due to the reflections, an anti-reflection coating is preferably applied. This coating may have a relatively low quality and a residual reflection of approximately 0.5%.

For this purpose the entrance or exit faces of the light guides may also be arranged obliquely on the light guides, as is known from the contribution by C. K. Wong et al., entitled "General purpose single-mode laser package provided with parallel beam output having −60 dB interface feedback" to the fourteenth ECOC Conference held in Brighton in September 1988 and published on pp. 215–218 of the proceedings of this conference.

The invention also relates to a mirror system which is suitable for use in a heterodyne or homodyne detection device. Such a mirror system is characterized, for example, in that the value of at least one of the angles is different from 90° and the sum of two angles located opposite to each other is 180°. An embodiment of a mirror system in which the angles of the mirror portions can be accurately controlled is characterized in hat the mirror system comprises at least one prism having two side faces which enclose an apex angle and in that said two side faces of the prism are provided with partially transparent reflecting layers.

A mirror system according to the invention is preferably combined in a single optical component.

These and other, more detailed aspects of the invention will be described in greater detail and explained with reference to the drawings.

BRIEF DESCRIPTION OF THE DRAWINGS

In the drawings

FIG. 5 shows an embodiment of the device according to the invention in which the entrance and exit faces of

DETAILED DESCRIPTION OF THE PREFERRED EMBODIMENTS

Figure 1:
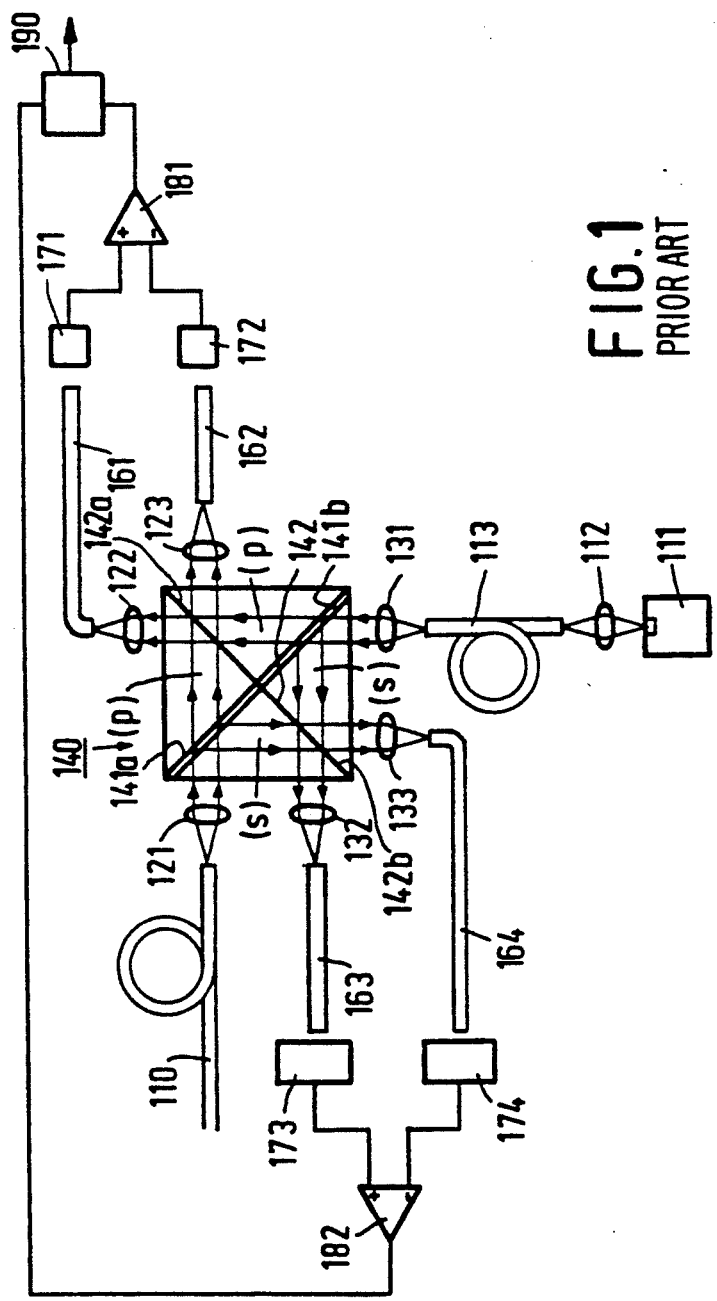
FIG. 1 shows an optical heterodyne or homodyne detector.
Figure 3:
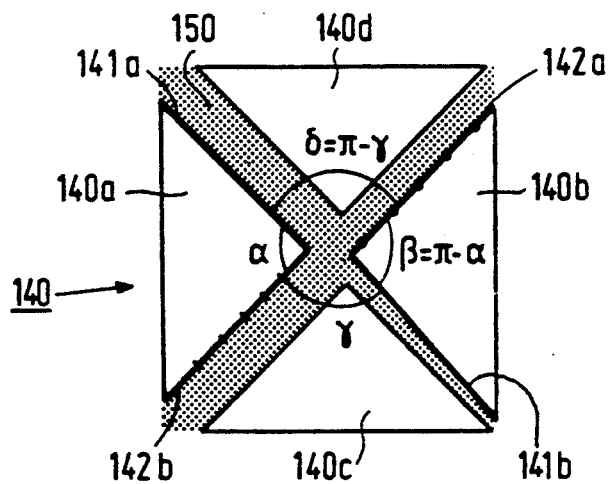
FIG. 3 shows an embodiment of an optical system according to the invention.

FIG. 1 shows diagrammatically a device for optical heterodyne or homodyne detection known from FIG. 3 of EP-A 0,345,889. The signal beam, coming from an optical transmission fiber 110, is converted by means of a lens 121 into a parallel beam which is incident on a first input of the system 140 integrated in an optical component. In a local oscillator 111 is generated radiation which is incident on a second input of the optical component 140 via the lens 112, the fiber 113 and the lens 131. This component has two faces which extend at right angles to each other. Both faces consist o two portions 141a and 141b, and 142a and 142b which meet in the centre of the component. Each of the portions comprises a beam-splitting layer, the layers in the portions 141a and 141b being reflective to one state of polarization and being transmissive to the other. The signal beam and the local oscillator beam are split by the beam-splitting layers in the faces 141a and 141b into two sub-beams having mutually perpendicular directions of polarization. In the Figure this is indicated by means of the symbols (p) and (s), the direction of polarization of the ongoing beams being referred to as the parallel diction (p) and the direction of polarization of the beams reflected on the faces 141a and 141b being referred to as the perpendicular direction (s). Each of the two sub-beams having a parallel (p) direction of polarization is split at the same location on the layer 142a into two sub-beams of equal intensity, the ongoing par of the signal beam coinciding with the reflected part of the local oscillator beam, and vice versa. The beam-splitting layer 142a thus functions as a beam-combining element. The two resultant combined sub-beams are passed to the opto-electrical converters 171 and 172 via the lenses 122 and 123 and the fibers 161 and 162. Analogously, the perpendicularly (s) polarized sub-beams of the local oscillator beam and the signal beam are combined on the layer 142b and passed to the opto-electrical converters 173 and 174 via the lenses 132 and 133 and the fibers 163 and 164.

Since the two output signals of the two sub-beams are in phase opposition to each other, the electric output signals of the two opto-electrical converters are combined by supplying these signals to a differential amplifier. The signals of the converters 171 and 172 are combined in a differential amplifier 181, those of the converters 173 and 174 are combined in the differential amplifier 182. Finally the output signals of the differential amplifiers 181 and 182 are combined in the circuit 190 whose output is an electric signal which is modulated with the same information as the optical signal which is supplied to the device via the transmission fiber 110.

In the embodiment described the angles between the portions 141a, 141b, 142a and 142b of the beam-splitting layers are right angles because the exit sub-beams of the local oscillator beam should have a direction which is equal to that of the exit sub-beams of the signal beams. However, it is not necessary for the portions 141a, 141b, 142a and 142b to extend at right angles to each other.

Figure 2:
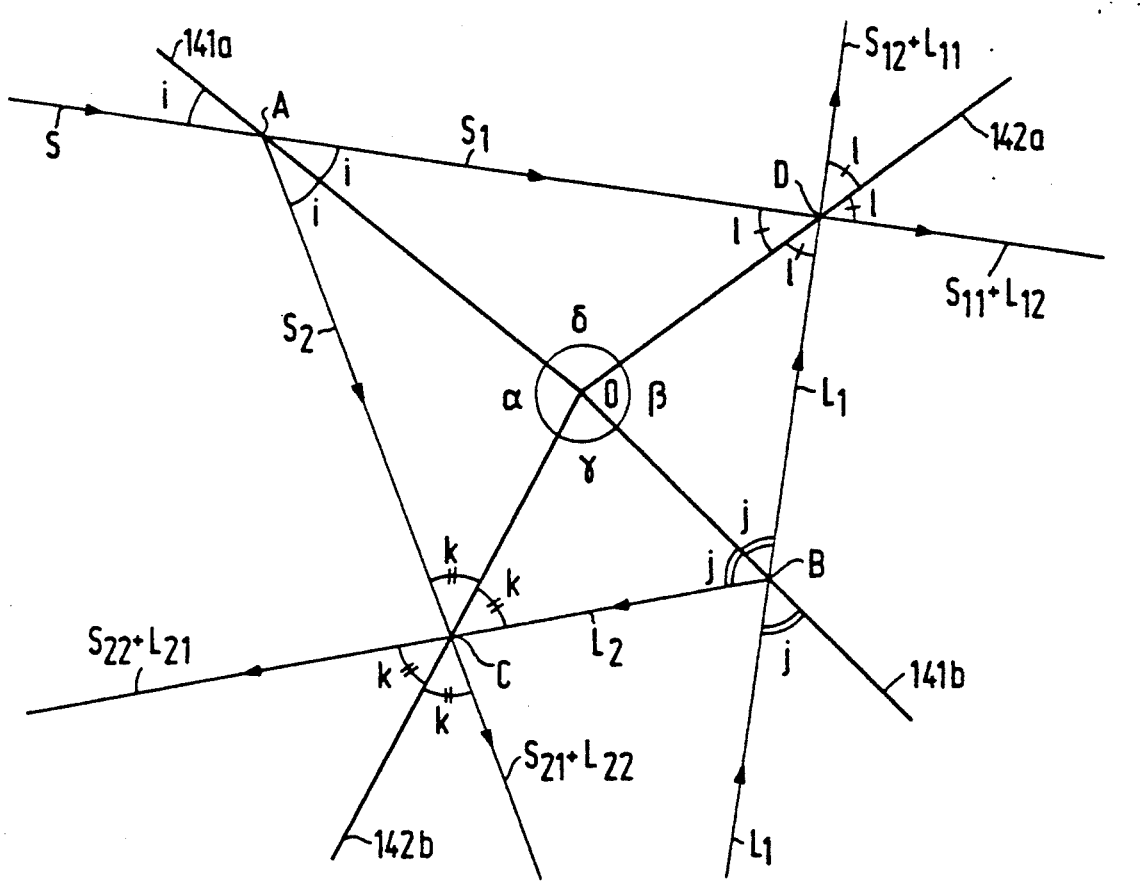
FIG. 2 illustrates the requirements with which the angles between the portions of the beam-splitting layers should comply.

In FIG. 2 the four portions, 141a, 141b, 142a and 142b of the beam-splitting layers are shown in which the portions mutually enclose the angles $\alpha$, $\gamma$, $\beta$ and $\delta$ at the common point O. A first radiation beam S, for example, the signal beam is incident on the plane 141a, the direction of the beam extending at an angle i with the plane 141a. In the plane the beam S is split into two sub-beams $S_1$, which is ongoing, and $S_2$, which is reflected, an which leave the plane at the same angle i. The two sub-beams $S_1$ and $S_2$ are incident with the planes 142a and 142b, respectively, the angles of incidence with the planes having the values l and k. IN the plane 142a the sub-beam $S_1$ is again split into two sub-beams $S_{11}$ and $S_{12}$ which leave the plane at the same angle l as the angle of incidence. The same applies to the plane 142b where the sub-beam $S_2$ is split into two sub-beams $S_{21}$ and $S_{22}$ which leave the plane at an angle k which is equal to the angle of incidence of the beam $S_2$.

The second entrance beam L which is incident at an angle j with the plane 141b is analogously split into sub-beams $L_1$ and $L_2$ which in their turn are split in the planes 142a and 142b into sub-beams $L_{11}$, $L_{12}$, $L_{21}$ and $L_{22}$. If the sub-beams $L_{11}$, $L_{12}$, $L_{21}$ and $L_{22}$ have the same direction as the sub-beams $S_{12}$, $S_{11}$, $S_{22}$ and $S_{21}$, respectively, the sub-beam $L_1$ is incident on the plane 142a with an angle l and the angle between sub-beam $L_2$ and the plane 142b is equal to k.

The relations between the angles in FIG. 2 are: for the triangle OAC: $\alpha + i + k = 180°$; for the triangle OCB: $\gamma + k + j = 180°$, for the triangle OBD: $\beta + j + l = 180°$; for the triangle ODA: $\delta + l + i = 180°$; and for the square ABCD: $2(i + j + k + l) = 360°$. It follows directly from these relations that $\alpha + \beta = \gamma + \delta = 180°$. The sum of the two opposite angles $\alpha$ and $\beta$, or $\gamma$ and $\delta$, must thus be 180° so as to achieve that the exit sub-beams of the signal beam and the local oscillator beam exit in the same direction.

A shift of the planes 141a, 141b, 142a and 142b with respect to each other, so that the planes do not have a common point O, has no influence on the direction of the exit beams but on the mutual distance between the principal axes of the beams. In a practical embodiment the existence of such a mutual distance can be solved by rendering the beam diameters so large by means of the collimator lenses that a sufficient extent of overlap on the detectors is obtained, even when the beams are slightly shifted with respect to each other.

FIG. 3 shows as embodiment of the optical system 140 implemented as an optical component, in which the principle described hereinbefore is used. The component comprises four subprisms of portions, the prisms 140a, 140b, 140c and 140d whose side faces are sealed to each other by means of an optical adhesive 150 whose refractive index after curing is equal to that of the material of the prisms. The apex angles $\alpha$ and $\beta$ of the prisms 140a and 140b facing each other are chosen to be such that their sum is 180°. The beam-splitting layers 141a and 142b are provided on the two side faces of the prism 140a facing the prisms 140d and 140c, respectively. The layers 142a and 141b are provided on the side faces of the prism 140b facing the prisms 140d and 140c. By providing the beam-splitting layers in this manner, the mutual angle between the beam-splitting faces is ensured, even when the alignment between the four prisms after sealing is not optimum. Each angle $\alpha$ and $\beta$ preferably has a value of 90°, but as has been apparent from the foregoing, a different choice is possible. When combining the prisms 140a, 140b, 140c and 140d to one component, an accurate alignment of the prisms with respect to each other is not necessary. Since the quality of the component 140 is determined by the prisms 140a and 140b, the two other prisms (140c and 140d) may be less accurate and hence less expensive. The two prisms 140c and 140d may even be dispensed with by filling up the relevant space with adhesive. When measures are taken which allow for a variation of the refractive index at the faces 141a, 141b and 142a and 142b, the space for the prisms 140c and 140d may even remain completely empty.

As described with reference to FIG. 1, radiation beams having a different but fixed state of polarization are incident on the portions 142a and 142b. This means that the beam-splitting layer in the portion 142a need not have a composition which is identical to that of the layer in the portion 142b. For the correct operation of the device it is sufficient that the portion 142a where the incident radiation is parallel polarized is provided with a layer which passes and reflects parallel-polarized radiation to the desired extent, while the other portion 142b has this property for perpendicularly polarized radiation.

Figure 4A:
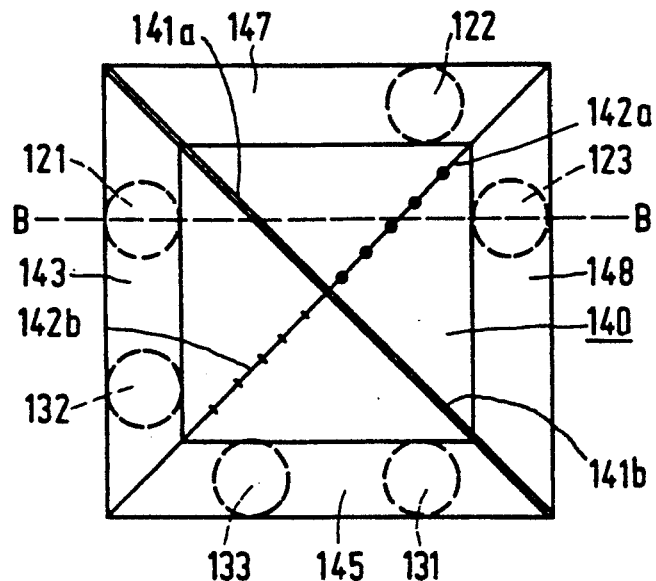
FIGS. 4a and 4b show further embodiments of an optical system according to the invention.
Figure 4B:
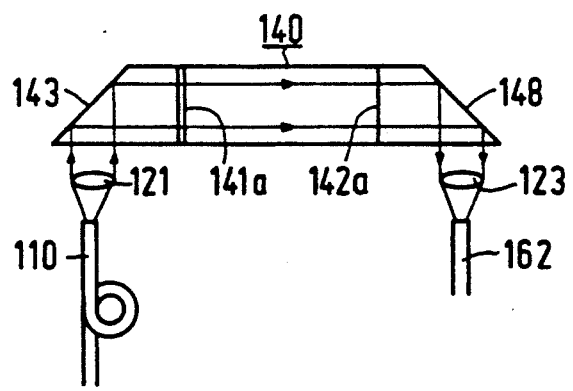

FIGS. 4a and 4b show embodiments in which the integrated component is provided with reflecting faces for deflecting the entrance and exit beams. As in the previous Figures, the optical component 140 has polarization-sensitive beam-splitting layers 141a and 141b and beam-splitting layers 142a and 142b. The sides of the component 140 are bevelled at an angle of 45° so that each one of the four sides has a reflecting face 143, 145, 147 or 148. These reflecting faces enable the entrance and exit radiation beams to be reflected on these faces before and after they are split and combined by the beam-splitting layers 141, 142a and 142b. In the plan view shown in FIG. 4a the positions of the entrance and exit beams are denotes by lenses 121, 131, 122, 123, 132 and 133 in broken lines.

FIG. 4b is a side elevation of the optical component of FIG. 4a taken on the line B—B. The signal beam is launched into the component 140 from the fiber 110 via the collimator leans 121. In this component the beam is reflected on the face 143, split into perpendicularly polarized components by the polarization-sensitive beam splitter 141a and one of the components traverses the beam-splitting layer 142a where it is combined with a part of the local oscillator radiation. The combined beam is subsequently passed towards a detector via the reflecting face 148, the lens 123 and the radiation guide 162. The reflecting faces may be implemented in such a way that the entrance radiation beams enter at one side of the component and the exit beams leave the component at another side.

To reduce radiation losses at the air-to-glass interfaces of the optical component and particularly to prevent reflections on these surfaces from being disturbing, the entrance and exit faces of the optical component are provided with an anti-reflection coating. An anti-reflection coating alone is, however, not always sufficient to prevent any disturbing influence of reflected light. According to the invention the entrance and exit faces of the optical component are therefore arranged obliquely so that the normal of the faces extends at an angle of approximately 1° to the direction of the radiation beam passing therethrough. This is shown diagrammatically in the device of FIG. 5. FIG. 5 is largely identical to FIG. 1 with the exception of the optical component and the ends of the light guides. Reference is made to FIG. 1 for a description of the elements which will not be described hereinafter. The optical component 540 has entrance and exit faces whose normal extends at an angle of approximately 1° to the direction of the radiation beams passing therethrough. The polarization-sensitive beam-splitting layers 541a and 541b and the beam-combining layers 542a and 542b have, however, the same position relative to the radiation beams as the corresponding faces 141a, 141b, 142a and 142b in FIG. 1. Since the entrance and exit faces are arranged obliquely, radiation reflected thereon is not received in the light guides and thus has no disturbing influence on the detection system. Since the disturbing influence of the reflections is eliminated in this manner, the anti-reflection coating only serves to reduce radiation losses. Therefore it is not necessary to apply a very high-grade anti-reflection coating on the faces of the component 540 but it will be sufficient to use an anti-reflection coating having a residual reflection of approximately 0.5%.

The optimum angle of obliqueness of the side faces of the optical component 540 depends on the distance to and the diameter of the collimator lenses 121–133 and is in the range of several tenths of a degree to several degrees. Also the end faces of the radiation guides 110, 113, 161, 162, 165 and 164 may be arranged obliquely with respect to the direction of the radiation beam. For a further description thereof reference is made to the afore-mentioned contribution by C. K. Wong et al. to ECOC 88, held in Brighton in September 1988. The oblique entrance and exit faces may also be used in combination with reflective faces shown in FIGS. 4a and 4b.

We claim:

1. A device for optical heterodyne or homodyne detection of an optical signal beam, which device comprises a local oscillator on optical system comprising a polarization-sensitive beam-splitting layer for splitting the signal beam into two orthogonally polarized sub-beams (p, s) and a beam-combining layer for combining signal beam radiation with radiation from the local oscillator, said device further comprising a detection system for converting the combined radiation into at least one electric signal which is suitable for further processing, characterized in that the beam-splitting layer and the beam-combining layer consists of two portions each, said four portions enclosing four angles ($\alpha$, $\beta$, $\gamma$, $\delta$,), the value of at least one of the angles being different from 90° and the sum of two angles located opposite each other being 180°.

2. A device as claimed in claim 1, characterized in that one of the angles and the angle located opposite to it each have a value of 90°.

3. A device as claimed in claim 1, characterized in that each portion of the beam-combining layer has a polarization-dependent transmission and/or reflection coefficient and in that each portion is arranged in the radiation path of one of the sub-beams (p, s) for passing and reflecting the radiation in the respective sub-beam (t, s).

4. A device as claimed in claim 3 in which the radiation is incident on the portions of the beam-combining layer at an angle of substantially 45° and in which said sub-beams are linearly polarized, characterized in that each of the two portions of the beam-combining layer is individually optimized for passing and reflecting radiation, which radiation is linearly polarized in the p and s directions, respectively, with respect to the polarization-sensitive beam-splitting layer.

5. A device as claimed in claim 1, characterized in that the optical system has at least one reflecting face which is arranged in a radiation path of an entrance or exit radiation beam for deflecting said entrance or exit radiation beam.

6. A device as claimed in claim 1 in which said optical system is integrated with an optical component, characterized in that the optical component has at least one entrance or exit face whose normal extends at an angle to the radiation path of a radiation beam through said entrance or exit face, said angle having a value of between approximately several tenths of a degree and several degrees.

7. A device for optical heterodyne or homodyne detection of an optical signal beam, which device comprises a local oscillator, an optical system comprising a polarization-sensitive beam-splitting layer for splitting the signal beam into two orthogonally polarized sub-beams (p, s) and a beam-combining layer for combining signal beam radiation with radiation from the local oscillator, and a detection system for converting the combined radiation into at least one electric signal which is suitable for further processing, characterized in that the optical system comprises at least one prism having two side faces which enclose an apex angle and in that said two side faces of the prism are provided with a portion of the beam-splitting and beam-combining layers, respectively.

8. A device as claimed in claim 7, characterized in that the optical system comprises two prisms arranged opposite each other whose apex angles are located opposite each other and in that the side faces of the two prisms enclosing the apex angles are provided with portions of the beam-splitting and beam-combining layers, respectively.

9. A device as claimed in claim 7, characterized in that the apex angle of said prism has a value of 90°.

10. A mirror system for splitting a first (S) and a second (L) incident radiation beam into four exit sub-beams each ($S_{11}$, $S_{12}$, $S_{21}$, $S_{22}$; $L_{11}$, $L_{12}$, $L_{21}$, $L_{22}$), while each sub-beam originating from the second incident radiation beam exits in the same direction as one of the sub-beams originating from the first incident radiation beam, said mirror system comprising four partially transparent mirror portions enclosing four angles ($\alpha$, $\beta$, $\gamma$, $\delta$), characterized in that the value of at least one of the angles is different from 90° and the sum of two angles located opposite each other is 180°.

11. A mirror system as claimed in claim 10, characterized in that at least one of the enclosed angles has a value of 90°.

12. A mirror system as claimed in claim 10, characterized in that at least one of the mirror portions is a polarization-sensitive mirror.

13. A mirror system as claimed in claim 10, characterized in that the mirror portions are constructively integrated to form a single optical component.

14. A mirror system for splitting a first (S) and a second (L) incident radiation beam into four exit sub-beams each ($S_{11}$, $S_{12}$, $S_{21}$, $S_{22}$; $L_{11}$, $L_{12}$, $L_{21}$, $L_{22}$), while each sub-beam originating from the second incident radiation beam exits in the same direction as one of the sub-beams originating from the first incident radiation beam, characterized in that the mirror system comprises at least one prism having two side faces which enclose an apex angle and in that said two side faces of the prism are provided with partially transparent reflecting layers.

15. A mirror system as claimed in claim 14, characterized in that the mirror portions are constructively integrated to form a single optical component.

* * * * *